US010059179B1

(12) United States Patent
Wolf et al.

(10) Patent No.: US 10,059,179 B1
(45) Date of Patent: Aug. 28, 2018

(54) MOVABLE PANELS WITH NONLINEAR TRACKS

(71) Applicants: Philipp J. Wolf, Santa Clara, CA (US); John Raff, Menlo Park, CA (US); Donald R. Monroe, Los Gatos, CA (US)

(72) Inventors: Philipp J. Wolf, Santa Clara, CA (US); John Raff, Menlo Park, CA (US); Donald R. Monroe, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/648,769

(22) Filed: Jul. 13, 2017

Related U.S. Application Data

(60) Provisional application No. 62/372,474, filed on Aug. 9, 2016.

(51) Int. Cl.
*B60J 7/057* (2006.01)
*E05D 15/10* (2006.01)
*E05D 15/30* (2006.01)
*B60J 7/04* (2006.01)

(52) U.S. Cl.
CPC ............... *B60J 7/057* (2013.01); *B60J 7/04* (2013.01); *E05D 15/101* (2013.01); *E05D 15/1047* (2013.01); *E05D 15/30* (2013.01); *E05D 2015/1057* (2013.01); *E05Y 2900/542* (2013.01)

(58) Field of Classification Search
CPC .... B60J 7/04; B60J 7/043; B60J 7/057; E05D 15/30

USPC ................. 296/216.04, 216.05, 223
See application file for complete search history.

(56) References Cited

U.S. PATENT DOCUMENTS

| | | | | |
|---|---|---|---|---|
| 7,182,400 | B2 * | 2/2007 | Grimm | B60J 7/043 |
| | | | | 296/216.08 |
| 9,375,998 | B2 * | 6/2016 | Nellen | B60J 7/02 |
| 2005/0001457 | A1 * | 1/2005 | Bohm | B60J 7/02 |
| | | | | 296/216.04 |
| 2006/0080903 | A1 * | 4/2006 | Grimm | B60J 7/02 |
| | | | | 52/64 |

FOREIGN PATENT DOCUMENTS

| | | | |
|---|---|---|---|
| DE | 585481 | C | 10/1933 |
| DE | 4306451 | C1 | 3/1994 |
| DE | 10143823 | * | 3/2003 |
| DE | 10201636 | A1 | 8/2003 |
| EP | 0613799 | A1 | 9/1994 |
| FR | 772198 | A | 10/1934 |

* cited by examiner

*Primary Examiner* — Dennis H Pedder
(74) *Attorney, Agent, or Firm* — Young Basile Hanlon & MacFarlane, P.C.

(57) ABSTRACT

A vehicle includes a movable panel that is movable between a closed position and an open position, a first track, a second track, and an arm that is connected to the movable panel, the first track, and the second track. A lateral spacing between the first track and the second track varies along the first track and the second track in a front-to-rear direction. The arm pivots with respect to the first track and the second track in correspondence with the lateral spacing between the first track and the second track during movement of the arm along the first track and the second track.

20 Claims, 11 Drawing Sheets ical field

The application relates generally to movable panel assemblies for vehicle roofs.

BACKGROUND

Automobile windows function in part to admit light into the interior of a vehicle. Some automobile windows, such as windows incorporated in automobile doors, are movable to an open position to admit air into the interior of the vehicle. In order to admit additional light and air into the interior, some fixed-roof automobiles include a movable panel known as a sunroof. Sunroofs come in many styles, with the most popular styles incorporating a sliding mechanism that moves a sunroof panel rearward out of a sunroof opening, either to a compartment internal to the roof of the vehicle or to a position external to the roof of the vehicle.

SUMMARY

One aspect of the disclosed embodiments is a vehicle that includes a movable panel that is movable between a closed position and an open position, a first track, a second track, and an arm that is connected to the movable panel, the first track, and the second track. A lateral spacing between the first track and the second track varies along the first track and the second track in a front-to-rear direction. The arm pivots with respect to the first track and the second track in correspondence with the lateral spacing between the first track and the second track during movement of the arm along the first track and the second track.

Another aspect of the disclosed embodiments is a vehicle that includes a roof panel, an opening that is formed in the roof panel, a movable panel that is movable between a closed position and an open position, a track assembly, a first arm and a second arm. In the closed position, the movable panel obstructs the opening. In the open position, at least a portion of the opening is not obstructed by the movable panel. A first track assembly is positioned on a first lateral side of the opening and a second track assembly is positioned on a second lateral side of the opening. A distance between the first track assembly and the second track assembly is smaller at a first location that at a second location. Each of the first track assembly and the second track assembly have a first sliding member that is slidable forward and rearward along a first path and a second sliding member that is slidable forward and rearward along a second path. The first arm is pivotally connected to the movable panel, pivotally connected to the first sliding member of the first track assembly, and pivotally connected to the second sliding member of the first track assembly. The second arm is pivotally connected to the movable panel, pivotally connected to the first sliding member of the second track assembly, and pivotally connected to the second sliding member of the second track assembly. The first path and the second path of each of the first track assembly and the second track assembly are farther apart from one another at the second location as compared to the first location to cause pivoting of the first arm and the second arm in response to movement of the movable panel between the closed position and the open position.

Another aspect of the disclosed embodiments is a vehicle that includes a movable panel that is movable between a closed position and an open position, a track body that extends along an axis the track body having a length direction, tracks that are defined on the track body, and a trolley. The tracks define changing radial angles relative to the track body along the length direction of the track body. The trolley is disposed on the track body, engaged with the tracks, and connected to the movable panel. Movement of the trolley along the tracks causes rotation of the trolley around the axis of the track body according to the radial angles of the tracks relative to the axis. Rotation of the trolley raises and lowers the movable panel relative to the track body.

DETAILED DESCRIPTION

The following disclosure relates to movable panel assemblies for automobiles, which may also be referred to as sunroofs.

Figure 1:
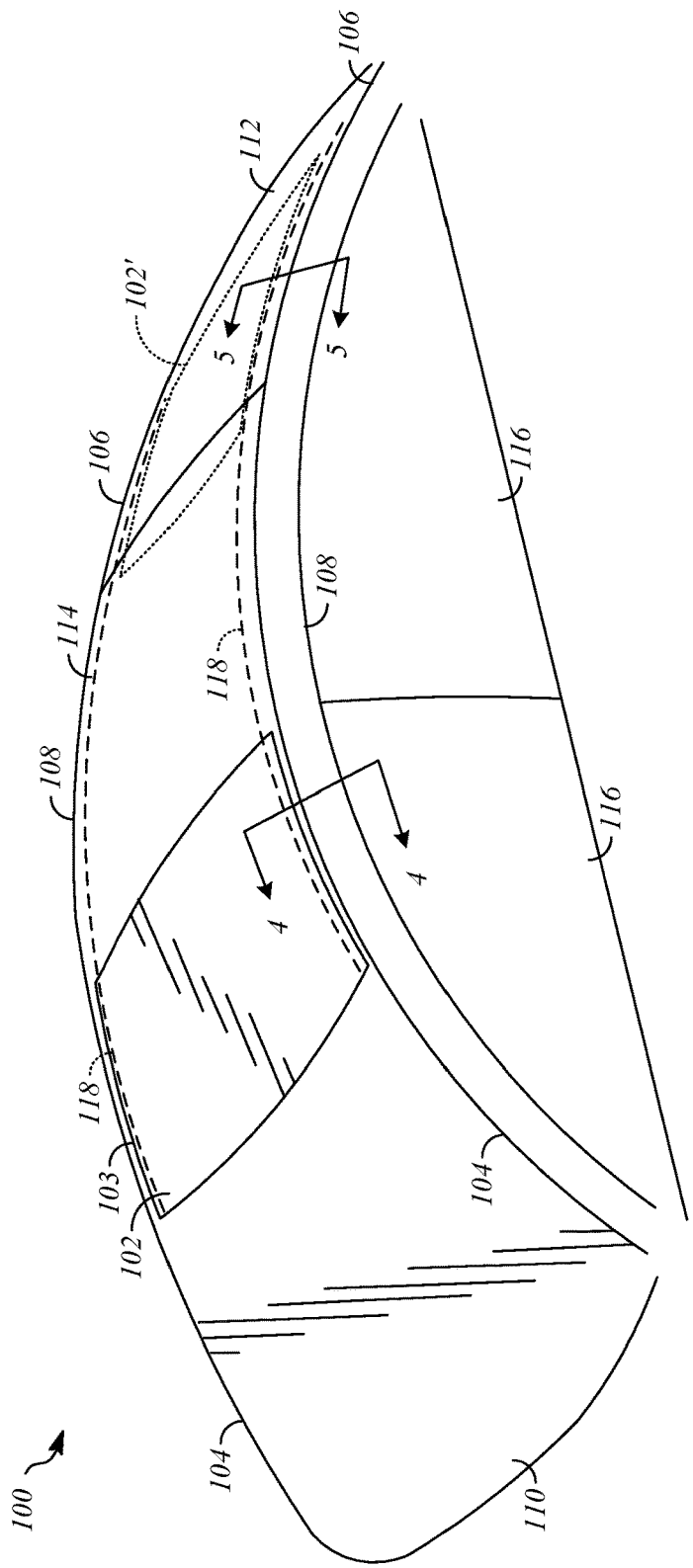
FIG. 1 is a perspective view of a portion of a first vehicle that includes a movable panel and a track assembly, showing the movable panel in a closed position and an open position.

FIG. 1 is a perspective view of a portion of a first vehicle 100 with a movable panel 102 in a closed position. The movable panel 102 is movable from the closed position to an open position of the movable panel 102' (shown in broken lines).

The movable panel 102 is operable to move relative to an opening 103 that is defined in the roof area of the first vehicle 100. The movable panel 102 obstructs the opening 103 when the movable panel 102 is in the closed position, and the movable panel 102 is moved such that part, most, or all of the opening is not obstructed when the movable panel 102 is in the open position. The movable panel 102 may be generally planar or may incorporate a slight curvature that corresponds to the shape of surrounding portions of the first vehicle 100. The movable panel 102 may have a generally constant thickness. Suitable materials for the movable panel 102 include, but are not limited to, glass, metal, and plastic. In some embodiments, the movable panel 102 is transparent or translucent, such as when the movable panel 102 is formed from glass or plastic.

The portion of the first vehicle 100 that is illustrated in FIG. 1 is sometimes referred to as the greenhouse of the first vehicle 100, and may include front pillars 104, rear pillars 106, and longitudinal rails 108 (i.e., cant rails). The front pillars 104, the rear pillars 106, and the longitudinal rails 108 are structural members that define the shape of the greenhouse of the first vehicle 100, and resist forces applied to the first vehicle 100 during a collision. The front pillars 104 and the rear pillars 106 extend upward from a body portion (not shown) of the first vehicle 100, which may include one or more of a frame, a subframe, a unibody, a monocoque, and exterior body panels. The longitudinal rails 108 may be generally horizontal, and may extend from the front pillars 104 to the rear pillars 106 in order to interconnect the front pillars 104 and the rear pillars 106. In differently configured vehicles, the longitudinal rails 108 may extend from a different pair of pillars, such as from a first structural pillar of any type to a second structural pillar of any type, or the longitudinal rails 108 may be supported by a single structural pillars, such as in a cantilevered configuration.

A front window 110 (i.e., a windshield) is positioned adjacent to the front pillars 104 and extends between the front pillars 104 in a transverse direction of the first vehicle 100. A rear window 112 is positioned adjacent to the rear pillars 106 and extends between the rear pillars 106 in the transverse direction of the first vehicle 100. The movable panel 102 is positioned adjacent to the longitudinal rails 108 and extends between the longitudinal rails 108 in the transverse direction of the first vehicle 100.

In some embodiments, the first vehicle 100 includes a roof panel 114 that is positioned longitudinally between the movable panel 102 and the rear window 112, such that the roof panel 114 is rearward of the movable panel 102 and forward of the rear window 112. In some embodiments, the roof panel 114 is an integral portion of the rear window 112. In some embodiments, the roof panel 114 is omitted. In some embodiments, a second roof panel portion (not shown) is located forward of the movable panel 102, between the front window 110 and the movable panel 102.

The first vehicle 100 may include one or more side windows 116. The side windows 116 may be located on lateral sides of the first vehicle 100, adjacent to one or more of the front pillars 104, the rear pillars 106, and the longitudinal rails 108. The first vehicle 100 may also include one or more intermediate pillars (not shown) that extend downward from the longitudinal rails 108 and are positioned between pairs of the side windows 116.

To allow movement of the movable panel 102 between the closed position and the open position, the first vehicle 100 includes track assemblies 118 that support the movable panel 102. The track assemblies 118 include, for example, a first track assembly that is positioned on a first lateral side of the opening 103 and a second track assembly that is positioned on a second lateral side of the opening 103. The track assemblies 118 extend in the longitudinal direction of the vehicle, and are connected to the longitudinal rails 108 and/or the rear pillars 106. The track assemblies 118 are positioned on lateral sides of the movable panel 102. In some embodiments, the track assemblies 118 are positioned adjacent to and/or extend along the longitudinal rails 108 and/or the rear pillars 106. When viewed from above, the track assemblies 118 may be nonlinear. As an example, the track assemblies 118 may follow respective ones of the rear pillars 106 as they diverge from one another in the lateral direction from the tops of the rear pillars 106 to the bottoms of the rear pillars 106. Thus, a distance between the track assemblies 118 may be smaller at a first location closer to the front of the first vehicle 100, and the distance between the track assemblies 118 may be greater at a second location that is closer to the rear of the first vehicle 100.

Figure 2:
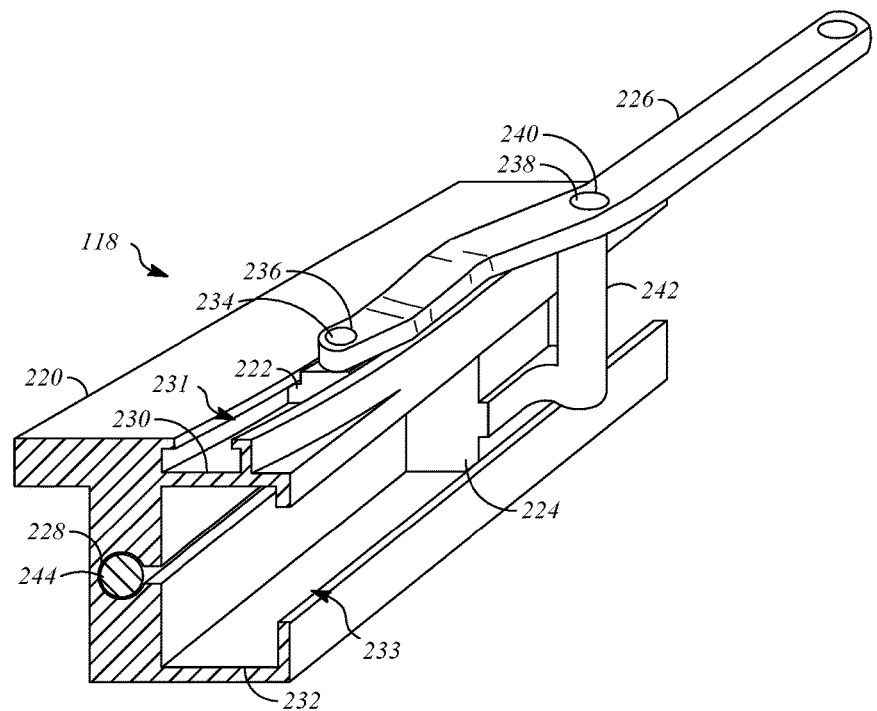
FIG. 2 is a perspective view showing a portion of the track assembly.

FIG. 2 is a perspective view showing a portion of one of the track assemblies 118. The track assembly 118 includes a track body 220, a first sliding member 222, a second sliding member 224, an arm 226, and an actuator cable 228. The arm 226 is connected to a first track 230 and a second track 232 for sliding motion along the first track 230 and the second track 232, and the arm 226 is connected to the movable panel 102 (FIG. 1) and may be pivotable with respect to the movable panel 102. In particular, the arm may be connected to the first track 230 by a pivotal connection to the first sliding member 222, and the arm 226 may be connected to the second track 232 by a pivotal connection to the second sliding member 224. The actuator cable 228 may be directly connected to the second sliding member 224 such that the actuator cable 228 directly causes motion of the second sliding member 224 and indirectly causes motion of the first sliding member 222, the arm 226, and the movable panel 102. As will be explained herein, the geometric configuration of the first track 230 and the second track 232 causes the arm 226 to pivot as the first sliding member 222 and the second sliding member 224 move forward and rearward along the first track 230 and the second track 232, such as during movement of the movable panel 102 between the closed and open positions. Pivoting of the arm 226 may by around an axis that is generally upright and may be around an axis that is generally perpendicular to an axis along which the track body 220 extends.

The track body 220 may be a single-part structure or a multi-part structure that defines two or more tracks such as the first track 230 and the second track 232. As one example, the track body 220 may be an extruded aluminum structure. The first track 230 and the second track 232 are each elongate structures that extend along the longitudinal rail 108 and/or the rear pillar 106 of the first vehicle 100 (FIG. 1) to guide components during the movement of the movable panel 102 between the closed position and the open position. The first track 230 has a first elongate opening 231 along its longitudinal length. The second track 232 has a second elongate opening 233 along its longitudinal length. In the illustrated example, the first elongate opening 231 is an upward-facing opening, and the second elongate opening 233 is an inward-facing opening. It should be understood, however, that the first elongate opening 231 and the second elongate opening 233 may be configured differently.

The first sliding member 222 is disposed in the first track 230. The first sliding member 222 has a cross-sectional geometry that is complimentary to the cross-sectional geometry of the first track 230, such that the first sliding member 222 may slide freely within the first track 230 along the longitudinal dimension of the first track 230. The first sliding member 222 may extend partially out of the first elongate opening 231. The first sliding member 222 is connected to the arm 226 such that the arm 226 is able to pivot with respect to the first sliding member 222. As an example, the arm 226 may be connected to the first sliding member 222 by a first pin 234. As one example, the first pin 234 may be disposed in a first aperture 236 of the arm 226. As another example, the first pin 234 may be formed integrally with the arm 226. As another example, the first pin 234 may be formed integrally with the first sliding member 222.

The second sliding member 224 is disposed in the second track 232. The second sliding member 224 has a cross-sectional geometry that is complimentary to the cross-sectional geometry of the second track 232, such that the second sliding member 224 may slide freely within the second track 232 along the longitudinal dimension of the second track 232. The second sliding member 224 may extend partially out of the second elongate opening 233. The second sliding member 224 is connected to the arm 226 such that the arm 226 is able to pivot with respect to the second sliding member 224. As an example, the arm 226 may be connected to the second sliding member 224 by a second pin 238. As one example, the second pin 238 may be disposed in a second aperture 240 of the arm 226. As another example, the second pin 238 may be formed integrally with the arm 226. As another example, the second pin 238 may be formed integrally with the second sliding member 224. In some embodiments, the second pin 238 may be received in a connecting portion 242 that is formed on the second sliding member 224. The connecting portion 242 extends out of the second elongate opening 233 of the second track 232 and is connected to the second pin 238, such as by receiving the second pin 238 in an aperture that is oriented in an upright direction.

In order to guide and retain the actuator cable 228, the track body 220 may define a cable recess 244. The cable recess 244 may be disposed adjacent to the second track 232, with the cable recess 244 being in communication with the interior space defined by the second track 232. This allows the actuator cable 228 to be connected to the second sliding member 224. Because of connection of the second sliding member 224 to the actuator cable 228, longitudinal motion of the actuator cable 228 within the cable recess 244 causes the second sliding member 224 to move longitudinally along the second track 232. The actuator cable 228 may be any suitable type of structure that can be connected to the second sliding member 224 in order to transfer motion to the second sliding member 224. In some embodiments, the actuator cable 228 is a push-pull cable.

Figure 3:
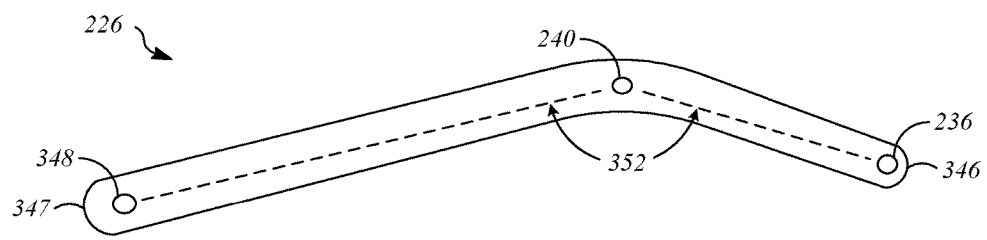
FIG. 3 is a top view showing an arm of the track assembly.

FIG. 3 is a top view that shows the arm 226 of the track assembly 118. The arm 226 extends from a first end 346 to a second end 347. The first aperture 236 is located adjacent to the first end 346 of the arm 226. The second aperture 240 is located between the first end 346 and the second end 347 of the arm 226. A third aperture 348 is located adjacent to the second end 347 of the arm 226. With reference to FIG. 2, it will be appreciated that the first sliding member 222 may be connected to the arm 226 adjacent to the first end 346 of the arm 226, the movable panel 102 may be connected to the arm 226 at the second end 347 of the arm 226, and the second sliding member 224 may be connected to the arm 226 at an intermediate location along the arm 226 between the first end 346 of the arm 226 and the second end 347 of the arm 226.

Dependent upon the geometric configuration of the longitudinal rails 108, the rear pillars 106, and the track body 220 including the first track 230 and the second track 232, the arm 226 may be straight, may be angled between two or more linear sections, may be curved, or may be curvilinear. In the illustrated example, the arm 226 includes a first portion 350 and a second portion 351. The first portion 350 extends from the first end 346 to the second aperture 240. The second portion 351 extends from the second aperture 240 to the second end 347. The second portion 351 is angled with respect to the first portion 350, such as by a first angle 352. The first angle 352 may be, for example, an obtuse angle between 90°-180°. Other angles may be defined between the first portion 350 and the second portion 351 to establish desired relative positions for the first aperture 236, the second aperture 240, and the third aperture 348.

Figure 4:
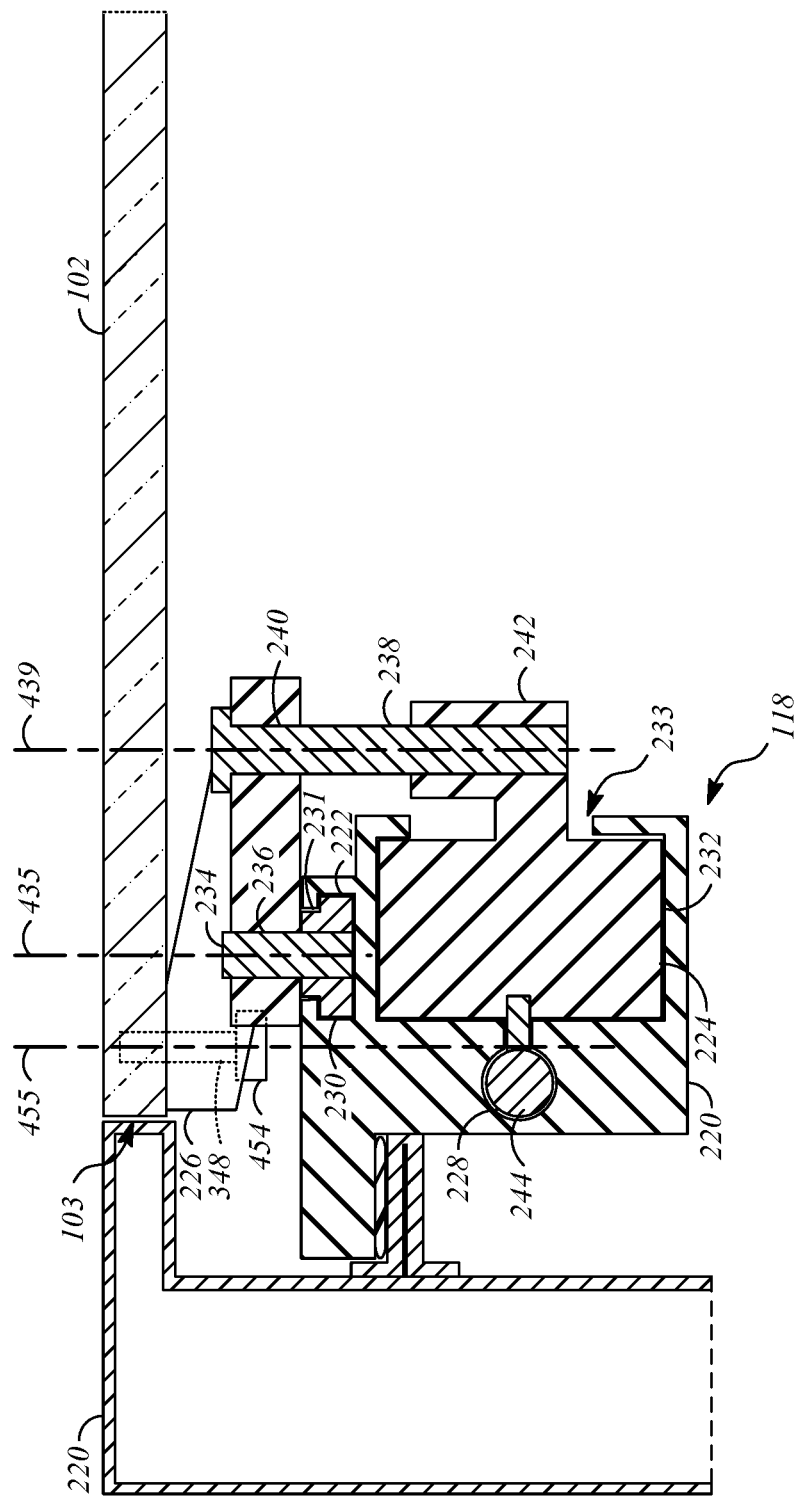
FIG. 4 is a cross-section view taken along line 4-4 of FIG. 1 showing the movable panel and the track assembly in the closed position.

FIG. 4 is a cross-section view taken along line 4-4 of FIG. 1 showing the movable panel 102 and the track assembly 118 in the closed position. The movable panel 102 occupies and obstructs the opening 103 in the closed position, such as by being disposed adjacent and in close proximity to part of the longitudinal rail 108. To cause motion of the movable panel 102 with respect to the longitudinal rail 108 and other portions of the first vehicle 100, the movable panel 102 is connected to the arm 226 of the track assembly 118. For example, the movable panel 102 may be connected to the arm 226 by a third pin 454 that extends through the third aperture 348 in the arm 226 and is connected to the movable panel 102, such as by being disposed in an aperture formed on a lower surface of the movable panel 102. As an example, the third pin 454 may be fixedly connected to the movable panel 102 and rotatable with respect to the arm 226.

During movement of the movable panel 102 from the closed position to the open position, the arm 226 pivots with respect to the first pin 234, the second pin 238, and the third pin 454. For example, the arm 226 may pivot with respect to the first pin 234 on a first axis 435, the arm 226 may pivot with respect to the second pin 238 on a second axis 439, and the arm 226 may pivot with respect to the third pin 454 on a third axis 455. In the illustrated example, the first axis 435, the second axis 439, and the third axis 455 are parallel to one another and are substantially upright. It should be understood, however, that the first axis 435, the second axis 439, and the third axis 455 could be oriented differently.

The location of the first axis 435 is constrained by the geometry of the first track 230, such that the first axis 435 follows the location of the first track 230 as the first sliding member 222 translates longitudinally within the first track 230. The location of the second axis 439 is constrained by the location and geometry of the second track 232, such that a relative location of the second axis 439 and the location of the second track 232 remain constant. In the illustrated example, the location of the second axis 439 is defined by the location of the connecting portion 242, which is part of the second sliding member 224 that is disposed in the second track 232. Thus, as the second sliding member 224 translates along the second track 232, the location of the second axis 439 changes in correspondence to the geometry of the second track 232. The location of the third axis 455 is dependent upon the geometry of the arm 226 and is dependent upon the geometries of the first track 230 and the second track 232. In particular, since the locations of the first axis 435 and the second axis 439 follow the first track 230 and the second track 232, rotation of the arm 226 is induced by deviations in the lateral spacing of the position of the first track 230 relative to the second track 232, which corresponds to deviations in the lateral spacing of the first axis 435 and the second axis 439. Thus, for example, as the first track 230 moves laterally outboard relative to the second track 232, the distance between the first track 230 and the second track 232 increases, and the location of the third axis 455 moves inboard. The third axis 455 may initially be located outboard of the first axis 435 and/or the second axis 439, and may cross the first axis 435 and/or the second axis 439 before moving further inboard such that the spacing between the third axis 455 increases as a result of rearward movement of the movable panel 102 subsequent to the point at which the third axis 455 crosses the first axis 435 and the second axis 439.

Figure 5:
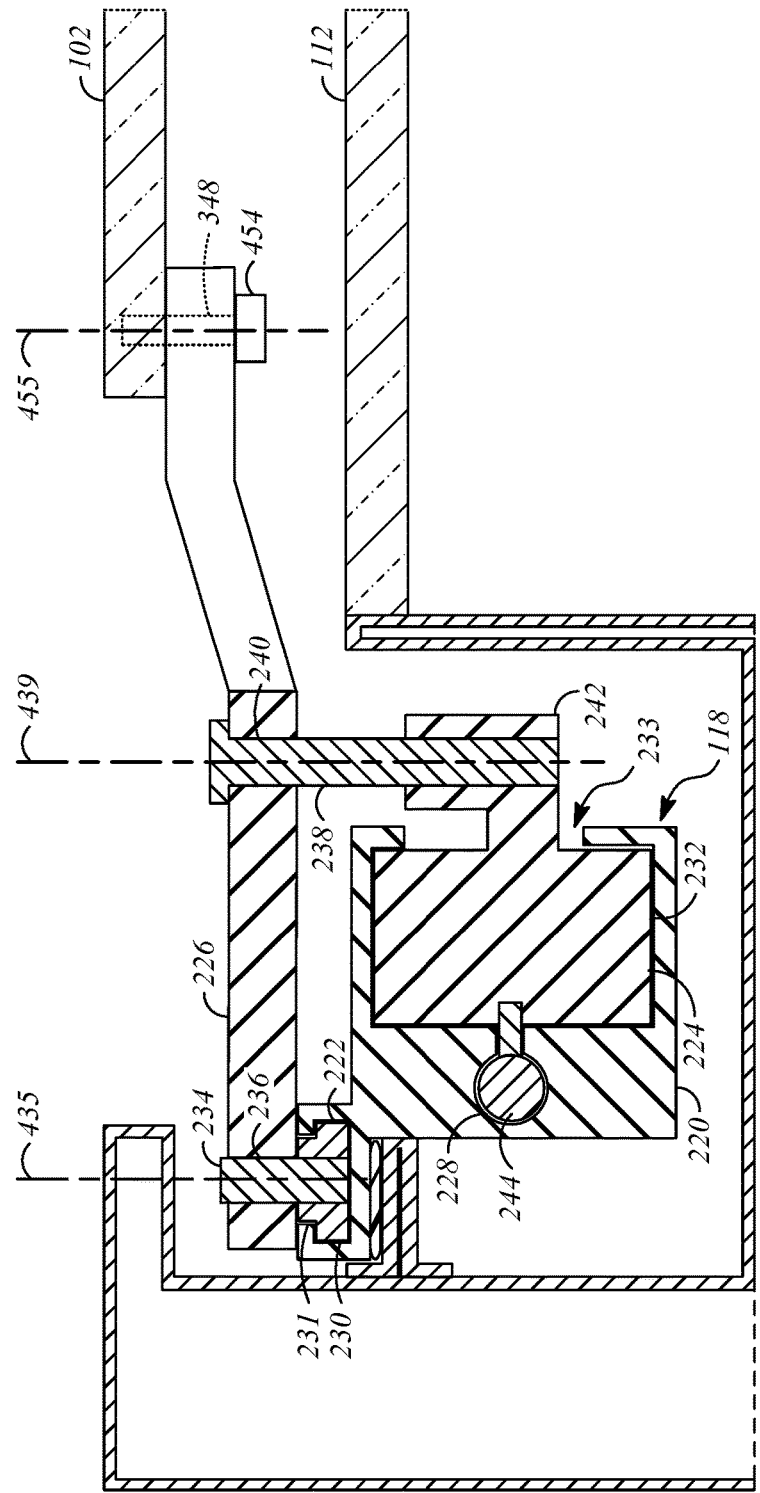
FIG. 5 is a cross-section view taken along line 5-5 of FIG. 1 showing the movable panel and the track assembly in the open position.

FIG. 5 is a cross-section view taken along line 5-5 of FIG. 1 showing the movable panel 102 and the track assembly 118 in the open position. As the track assembly 118 nears the rear of the first vehicle 100, the track assembly 118 curves in the outboard direction of the first vehicle 100. At the same time, the first track 230 diverges farther inboard than the second track 232. As a result, the inboard spacing of the first axis 435 increases relative to the second axis 439. As a result, the arm 226 pivots, thereby increasing the lateral distance between the second axis 439 and the third axis 455.

Figure 8:
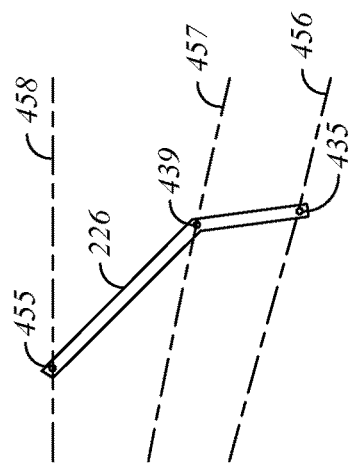
FIG. 8 is an illustration showing a third angular orientation of the arm member.
Figure 7:
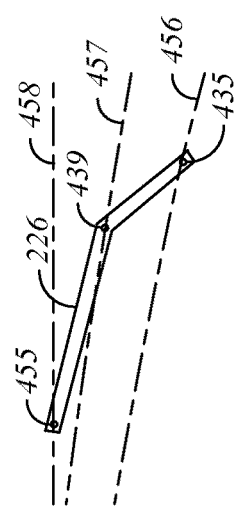
FIG. 7 is an illustration showing a second angular orientation of the arm member.
Figure 6:
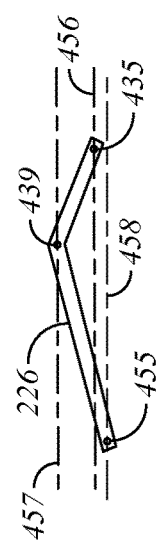
FIG. 6 is an illustration showing a first angular orientation of the arm member.

Motion of the arm 226 will be understood with reference to FIGS. 6-8, at which show a first angular orientation of the arm 226 (FIG. 6), a second angular orientation of the arm 226 (FIG. 7), and a third angular orientation of the arm 226 (FIG. 8). During movement of the arm 226 along the track body 220 in the longitudinal direction of the first vehicle 100, the first axis 435 follows a first path 456, the second axis 439 follows a second path 457, and the third axis 455 follows a third path 458. The first path 456 corresponds to the geometry of the first track 230. The second path 457 corresponds to the geometry of the second track 232. The third path 458 corresponds to motion of the movable panel 102 (FIG. 1) during movement between the closed and open positions.

FIG. 6 represents movement of the arm 226 near the closed position of the movable panel 102. In this example, the first path 456, the second path 457, and the third path 458 are substantially straight and extend in the longitudinal direction of the first vehicle 100 near the closed position. Thus, in the illustrated example, rotation of the arm 226 is not induced during longitudinal motion of the arm 226 near the closed position. FIG. 7 represents an intermediate position, in which the arm 226 has been rotated relative to the closed position. As shown in FIG. 7, the first path 456 and the second path 457 are diverging in an outboard direction relative to the third path 458. The third path 458 continues to extend straight in the longitudinal direction of the first vehicle 100. Thus, as the arm 226 rotates, the third axis 455 moves in the longitudinal direction of the first vehicle 100 and may do so without substantial lateral movement with respect to the first vehicle 100. FIG. 8 shows the arm 226 when the movable panel assembly is in the open position. In FIG. 8, the first path 456 and the second path 457 have diverged further outboard with respect to the third path 458 as compared to the intermediate position of FIG. 7. As a result, rotation of the arm 226 has increased. However, the third path 458 continues to extend in a longitudinal direction of the vehicle such that the third axis 455 moves in the longitudinal direction of the first vehicle 100 without substantial lateral movement when the movable panel 102 is near the open position.

Figure 9:
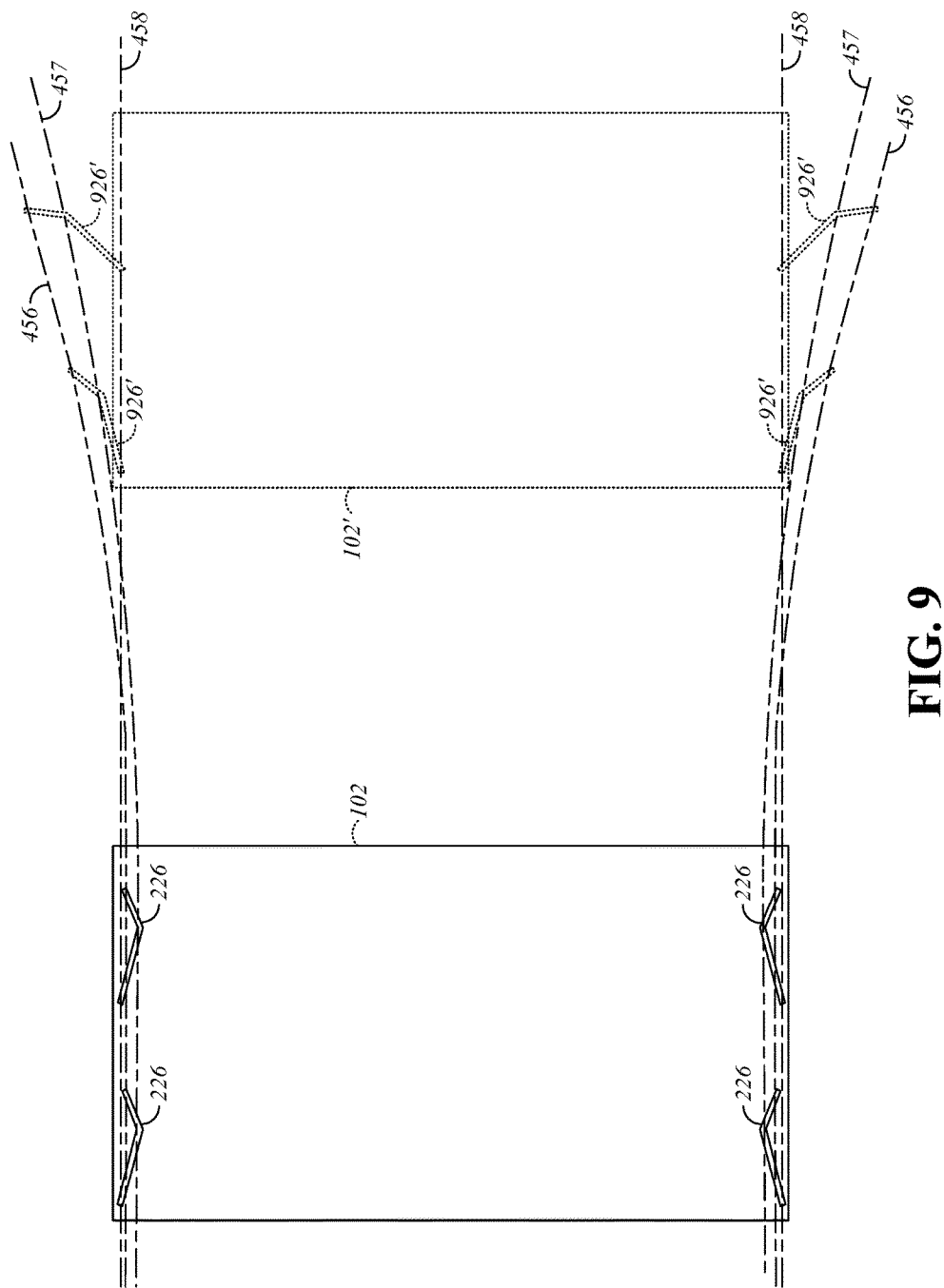
FIG. 9 is an illustration showing movement of the movable panel between the closed position and the open position.

FIG. 9 is an illustration showing movement of the movable panel 102 between the closed position and an open position. In this example, the movable panel 102 is supported by four arms 226 with two positions on each lateral side of the movable panel 102. As the movable panel 102 translates in the rearward direction with respect to the first vehicle 100, the arms 226 are guided along the first path 456, the second path 457, and the third path 458, as described with respect to FIGS. 6-8. Since the first path 456 and the second path 457 are farther apart from one another at a location corresponding to the open position as compared to a location corresponding to the closed position, following the first path 456 and the second path 457 causes pivoting of the arms 226 in response to movement of the movable panel 102 between the closed position and the open position.

As can be seen in FIG. 9, during movement from the closed position toward the open position, which is indicated by the movable panel 102' and the arms 926' in FIG. 9, the movable panel 102, 102' is constrained to move in the longitudinal direction of the vehicle by the third paths 458, which are fixed laterally in relation to the location of the movable panel 102, 102' as a result of connection of the arms 226, 926' to the movable panel 102, 102'. Thus, the movable panel 102, 102' is able to move longitudinally while the track assembly 118 including the track body 220, the first track 230, and the second track 232 are not constrained to a linear configuration. In addition, in some embodiments, the track assemblies 118 (FIG. 1) may be self-centering, and thus can maintain the lateral position of the movable panel 102, 102' between the track assemblies 118 without the need for a biasing force to urge the movable panel 102, 102' to a centered location.

Figure 10:
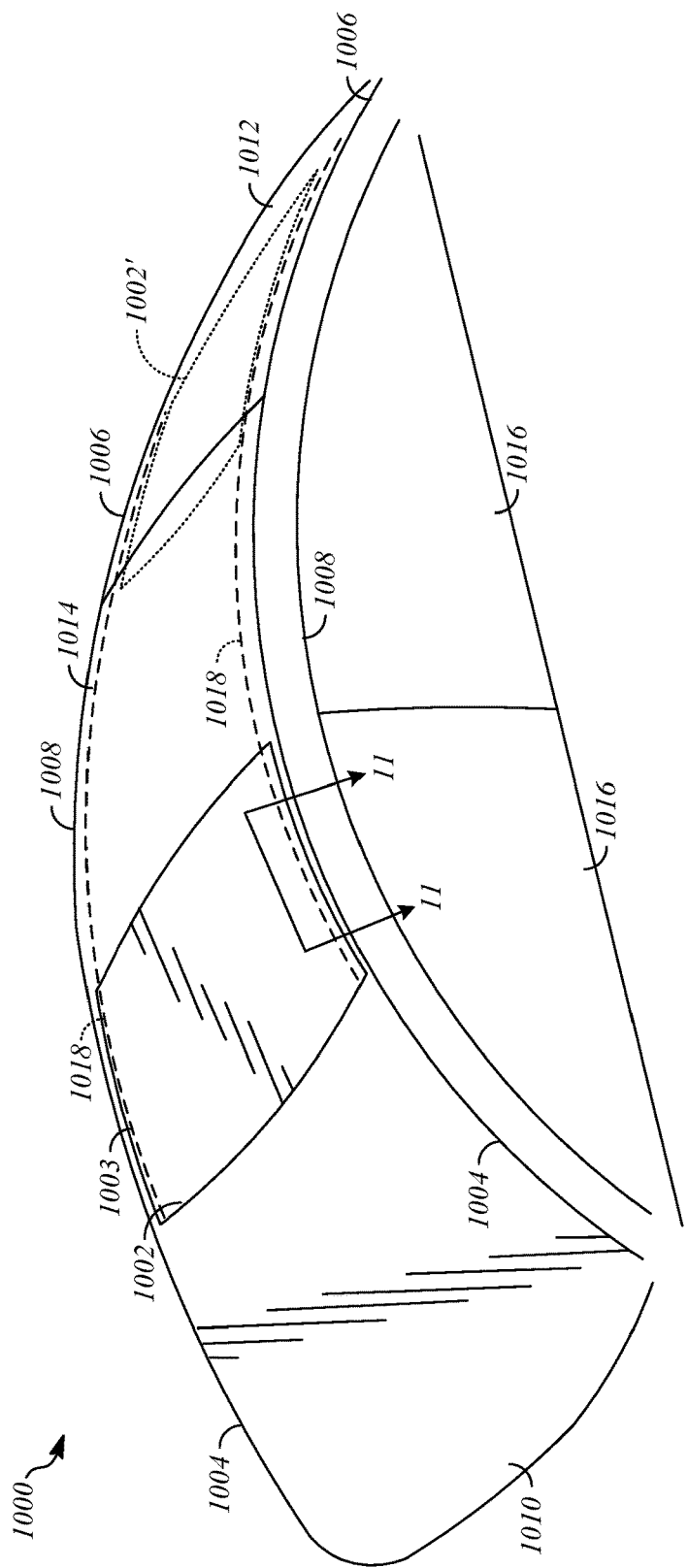
FIG. 10 is a perspective view of a portion of a second vehicle that includes a movable panel and a track assembly, showing the movable panel in a closed position and an open position.

FIG. 10 is a perspective view of a portion of a second vehicle 1000 with a movable panel 1002 in a closed position. The movable panel 1002 is movable from the closed position to an open position of the movable panel 1002' (shown in broken lines).

The movable panel 1002 is operable to move relative to an opening 1003 that is defined in the roof area of the second vehicle 1000. The movable panel 1002 obstructs the opening 1003 when the movable panel 1002 is in the closed position, and the movable panel 1002 is moved such that part, most, or all of the opening is not obstructed when the movable panel 1002 is in the open position. The movable panel 1002 may be generally planar or may incorporate a slight curvature that corresponds to the shape of surrounding portions of the second vehicle 1000. The movable panel 1002 may have a generally constant thickness. Suitable materials for the movable panel 1002 include, but are not limited to, glass, metal, and plastic. In some embodiments, the movable panel 1002 is transparent or translucent, such as when the movable panel 1002 is formed from glass or plastic.

The portion of the second vehicle 1000 that is illustrated in FIG. 10 is sometimes referred to as the greenhouse of the second vehicle 1000, and may include front pillars 1004, rear pillars 1006, and longitudinal rails 1008 (i.e., cant rails). The front pillars 1004, the rear pillars 1006, and the longitudinal rails 1008 are structural members that define the shape of the greenhouse of the second vehicle 1000, and resist forces applied to the second vehicle 1000 during a collision. The front pillars 1004 and the rear pillars 1006 extend upward from a body portion (not shown) of the second vehicle 1000, which may include one or more of a frame, a subframe, a unibody, a monocoque, and exterior body panels. The longitudinal rails 1008 may be generally horizontal, and may extend from the front pillars 1004 to the rear pillars 1006 in order to interconnect the front pillars 1004 and the rear pillars 1006. In differently configured vehicles, the longitudinal rails 1008 may extend from a different pair of pillars, such as from a first structural pillar of any type to a second structural pillar of any type, or the longitudinal rails 1008 may be supported by a single structural pillars, such as in a cantilevered configuration.

A front window 1010 (i.e., a windshield) is positioned adjacent to the front pillars 1004 and extends between the front pillars 1004 in a transverse direction of the second vehicle 1000. A rear window 1012 is positioned adjacent to the rear pillars 1006 and extends between the rear pillars 1006 in the transverse direction of the second vehicle 1000. The movable panel 1002 is positioned adjacent to the longitudinal rails 1008 and extends between the longitudinal rails 1008 in the transverse direction of the second vehicle 1000.

In some embodiments, the second vehicle 1000 includes a roof panel 1014 that is positioned longitudinally between the movable panel 1002 and the rear window 1012, such that the roof panel 1014 is rearward of the movable panel 1002 and forward of the rear window 1012. In some embodiments, the roof panel 1014 is an integral portion of the rear window 1012. In some embodiments, the roof panel 1014 is omitted. In some embodiments, a second roof panel portion (not shown) is located forward of the movable panel 1002, between the front window 1010 and the movable panel 1002.

The second vehicle 1000 may include one or more side windows 1016. The side windows 1016 may be located on lateral sides of the second vehicle 1000, adjacent to one or more of the front pillars 1004, the rear pillars 1006, and the longitudinal rails 1008. The second vehicle 1000 may also include one or more intermediate pillars (not shown) that extend downward from the longitudinal rails 1008 and are positioned between pairs of the side windows 1016.

To allow movement of the movable panel 1002 between the closed position and the open position, the second vehicle 1000 includes track assemblies 1018 that support the movable panel 1002. The track assemblies 1018 extend in the longitudinal direction of the vehicle, and are connected to the longitudinal rails 1008 and/or the rear pillars 1006. The track assemblies 1018 are positioned on lateral sides of the movable panel 1002. In some embodiments, the track assemblies 1018 are positioned adjacent to and/or extend along the longitudinal rails 1008 and/or the rear pillars 1006. When viewed from above, the track assemblies 1018 may be nonlinear. As an example, the track assemblies 1018 may follow respective ones of the rear pillars 1006 as they diverge from one another in the lateral direction from the tops of the rear pillars 1006 to the bottoms of the rear pillars 1006.

Figure 11:
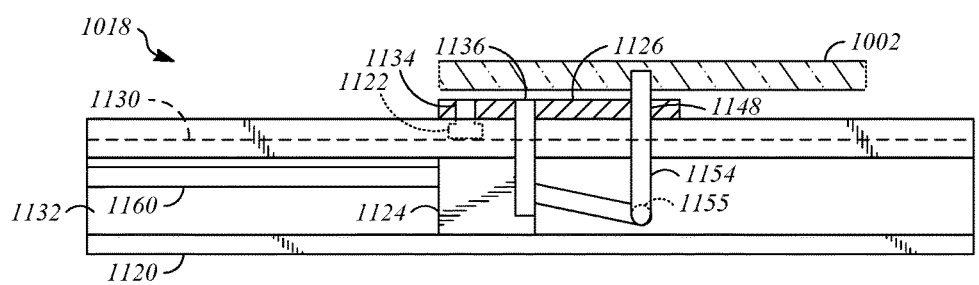
FIG. 11 is a cross-section view taken along line 11-11 of FIG. 10 showing a track assembly and the movable panel of the second vehicle in a lowered position.
Figure 12:
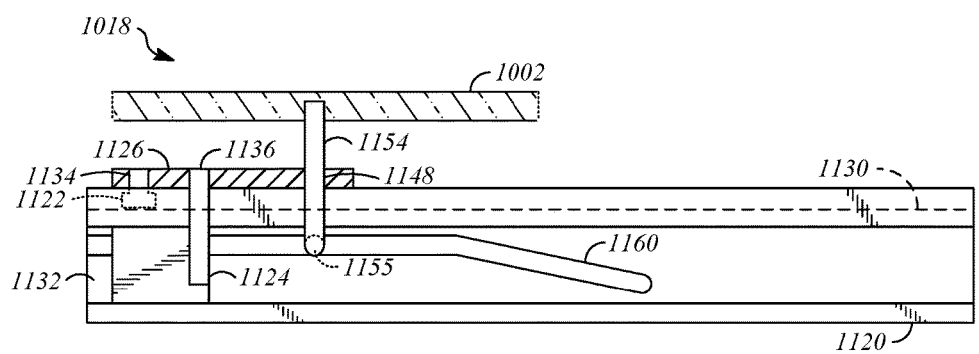
FIG. 12 is a cross-section view taken along line 11-11 of FIG. 10 showing the track assembly and the movable panel of the second vehicle in a raised position.

FIG. 11 shows the track assembly 1018 and the movable panel 1002 of the second vehicle 1000 in a lowered position, and FIG. 12 shows the track assembly 1018 and the movable panel 1002 of the second vehicle 1000 in a raised position. The track assembly 1018 and the movable panel 1002 are similar to the track assembly 118 and the movable panel 102 of FIG. 1, except as otherwise discussed herein.

The track assembly 1018 includes a track body 1120, a first sliding member 1122 that is disposed in a first track 1130 of the track body 1120, a second sliding member 1124 that is disposed in a second track 1132 of the track body 1120, and an arm 1126. The arm 1126 is connected to the first sliding member 1122 by a first pin 1134, and the arm 1126 is connected to the second sliding member 1124 by a second pin 1136. The arm 1126 is connected to the movable panel 1002 by a third pin 1154. The first track 1130 and the second track 1132 are configured as described with respect to the first track 230 and the second track 232, and therefore, longitudinal motion of the first sliding member 1122 and the second sliding member 1124 along the first track 1130 and the second track 1132 causes rotation of the arm 1126 in the same manner described with respect to the arm 226 of the track assembly 118.

The track assembly 1018 is configured to cause movement of the movable panel 1002 between the lowered position (FIG. 11) and the raised position (FIG. 12) during movement of the first sliding member 1122 and the second sliding member 1124 in the longitudinal direction along the track body 1120. In particular, the third pin 1154 extends through a third aperture 1148 that is formed through the arm 1126. The third pin 1154 is able to slide along its axis through the third aperture 1148. Thus, as the movable panel 1002 raises and lowers with respect to the arm 1126, the third pin 1154 may remain fixed with respect to the movable panel 1002 while sliding through the third aperture 1148.

In order to cause upward and downward motion of the movable panel 1002, an end portion 1155 of the third pin 1154 is disposed in a slot 1160 that is formed in the track body 1120. The third pin 1154 that connects the arm 1126 to the movable panel 1002, and the slot 1160 has a variable elevation relative to the first track 1130 and the second track 1132 to move the third pin 1154 upward and downward relative to the track body 1120 and the arm 1126 while the movable panel 1002 moves upward and downward in correspondence with the third pin 1154 and slot 1160.

As an example, the slot 1160 may be defined in an interior surface of the second track 1132. The slot 1160 has a varying height relative to the first track 1130 and the second track 1132 of the track body 1120. Thus, during longitudinal motion of the arm 1126 with respect to the track body 1120, the end portion 1155 of the third pin 1154 engages the slot 1160 and the changes in elevation of the slot 1160 relative to the track body 1120 cause corresponding changes in elevation of the movable panel 1002 relative to the track body 1120. As an example, near the closed position of the movable panel 1002, the slot 1160 may be at a relatively lower elevation relative to the track body 1120 in order to cause the movable panel 1002 to be in the lowered position while it is also in the closed position. As the movable panel 1002 is moved toward the open position by sliding motion of the first sliding member 1122 and the second sliding member 1124 with respect to the track body 1120 the elevation of the slot 1160 relative to the track body 1120 increases, causing the movable panel 1002 to rise during longitudinal motion of the first sliding member 1122 and the second sliding member 1124 because of interaction of the end portion 1155 of the third pin 1154 with the raised elevation of the slot 1160. In response to pivoting of the arm 1126, the third pin 1154 may translate laterally toward and away from the slot 1160. To allow for this lateral translation, the depth of the slot 1160 and the length of the end portion 1155 may be large enough to prevent disengagement of the third pin 1154 from the slot 1160.

Operation of the track assembly 1018 and the movable panel 1002 is otherwise as described with respect to the track assembly 118 and the movable panel 102 of FIG. 1.

Figure 13:
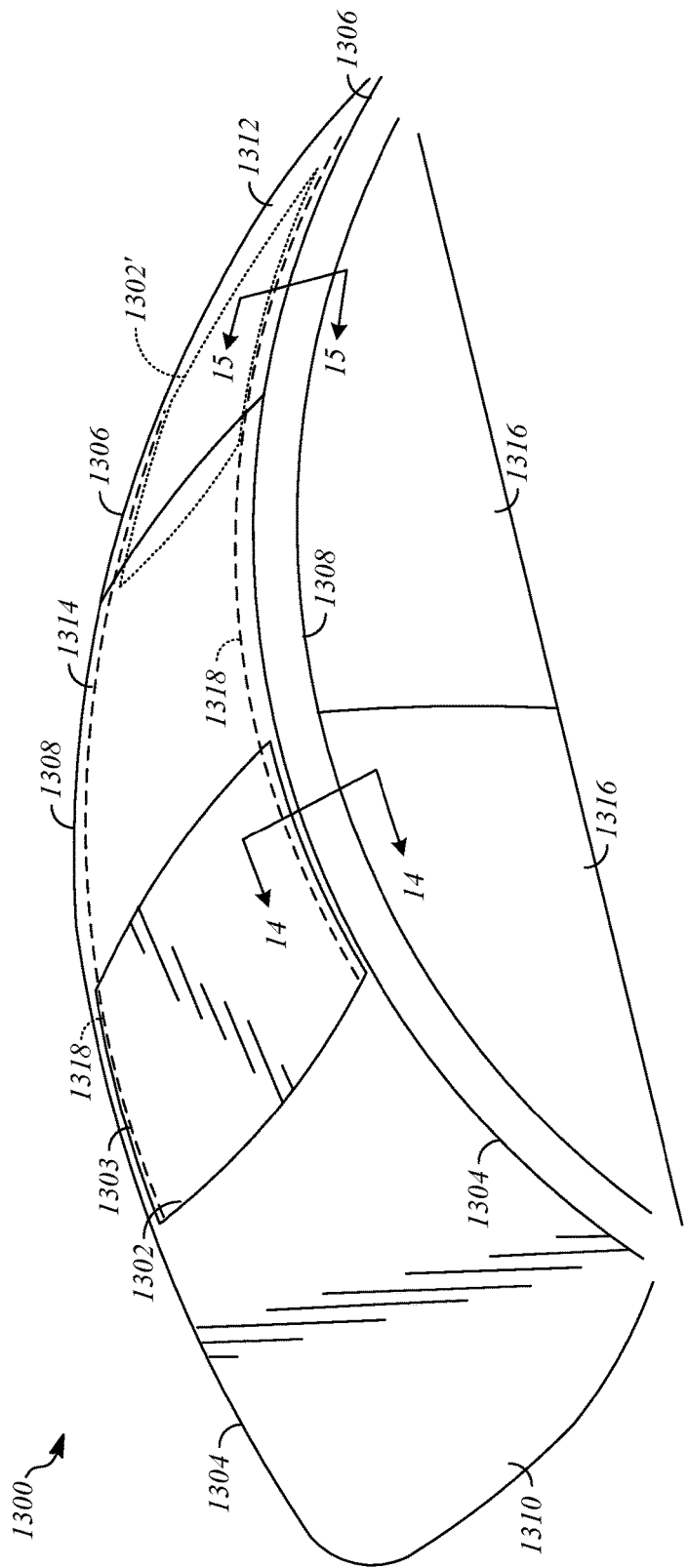
FIG. 13 is a perspective view of a portion of a third vehicle that includes a movable panel and a track assembly, showing the movable panel in a closed position and an open position.

FIG. 13 is a perspective view of a portion of a third vehicle 1300 with a movable panel 1302 in a closed position. The movable panel 1302 is movable from the closed position to an open position of the movable panel 1302' (shown in broken lines).

The movable panel 1302 is operable to move relative to an opening 1303 that is defined in the roof area of the third vehicle 1300. The movable panel 1302 obstructs the opening 1303 when the movable panel 1302 is in the closed position, and the movable panel 1302 is moved such that part, most, or all of the opening is not obstructed when the movable panel 1302 is in the open position. The movable panel 1302 may be generally planar or may incorporate a slight curvature that corresponds to the shape of surrounding portions of the third vehicle 1300. The movable panel 1302 may have a generally constant thickness. Suitable materials for the movable panel 1302 include, but are not limited to, glass, metal, and plastic. In some embodiments, the movable panel 1302 is transparent or translucent, such as when the movable panel 1302 is formed from glass or plastic.

The portion of the third vehicle 1300 that is illustrated in FIG. 13 is sometimes referred to as the greenhouse of the third vehicle 1300, and may include front pillars 1304, rear pillars 1306, and longitudinal rails 1308 (i.e., cant rails). The front pillars 1304, the rear pillars 1306, and the longitudinal rails 1308 are structural members that define the shape of the greenhouse of the third vehicle 1300, and resist forces applied to the third vehicle 1300 during a collision. The front pillars 1304 and the rear pillars 1306 extend upward from a body portion (not shown) of the third vehicle 1300, which may include one or more of a frame, a subframe, a unibody, a monocoque, and exterior body panels. The longitudinal rails 1308 may be generally horizontal, and may extend from the front pillars 1304 to the rear pillars 1306 in order to interconnect the front pillars 1304 and the rear pillars 1306. In differently configured vehicles, the longitudinal rails 1308 may extend from a different pair of pillars, such as from a first structural pillar of any type to a second structural pillar of any type, or the longitudinal rails 1308 may be supported by a single structural pillars, such as in a cantilevered configuration.

A front window 1310 (i.e., a windshield) is positioned adjacent to the front pillars 1304 and extends between the front pillars 1304 in a transverse direction of the third vehicle 1300. A rear window 1312 is positioned adjacent to the rear pillars 1306 and extends between the rear pillars 1306 in the transverse direction of the third vehicle 1300. The movable panel 1302 is positioned adjacent to the longitudinal rails 1308 and extends between the longitudinal rails 1308 in the transverse direction of the third vehicle 1300.

In some embodiments, the vehicle includes a roof panel 1314 that is positioned longitudinally between the movable panel 1302 and the rear window 1312, such that the roof panel 1314 is rearward of the movable panel 1302 and forward of the rear window 1312. In some embodiments, the roof panel 1314 is an integral portion of the rear window 1312. In some embodiments, the roof panel 1314 is omitted. In some embodiments, a second roof panel portion (not shown) is located forward of the movable panel 1302, between the front window 1310 and the movable panel 1302.

The third vehicle 1300 may include one or more side windows 1316. The side windows 1316 may be located on lateral sides of the third vehicle 1300, adjacent to one or more of the front pillars 1304, the rear pillars 1306, and the longitudinal rails 1308. The third vehicle 1300 may also include one or more intermediate pillars (not shown) that extend downward from the longitudinal rails 1308 and are positioned between pairs of the side windows 1316.

To allow movement of the movable panel 1302 between the closed position and the open position, the third vehicle 1300 includes track assemblies 1318 that support the movable panel 1302. The track assemblies 1318 extend in the longitudinal direction of the vehicle, and are connected to the longitudinal rails 1308 and/or the rear pillars 1306. The track assemblies 1318 are positioned on lateral sides of the movable panel 1302. In some embodiments, the track assemblies 1318 are positioned adjacent to and/or extend along the longitudinal rails 1308 and/or the rear pillars 1306. When viewed from above, the track assemblies 1318 may be nonlinear. As an example, the track assemblies 1318 may follow respective ones of the rear pillars 1306 as they diverge from one another in the lateral direction from the tops of the rear pillars 1306 to the bottoms of the rear pillars 1306.

Figure 14:
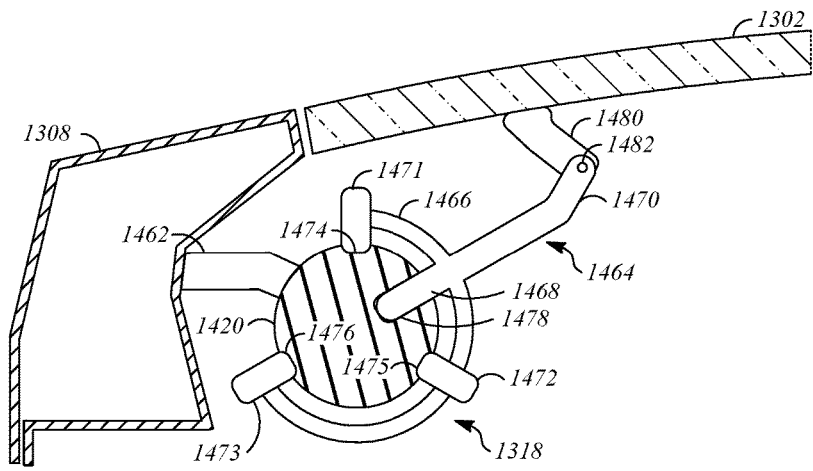
FIG. 14 is a cross-section view taken along line 14-14 of FIG. 13 showing a track assembly and the movable panel of the third vehicle in a lowered position.
Figure 15:
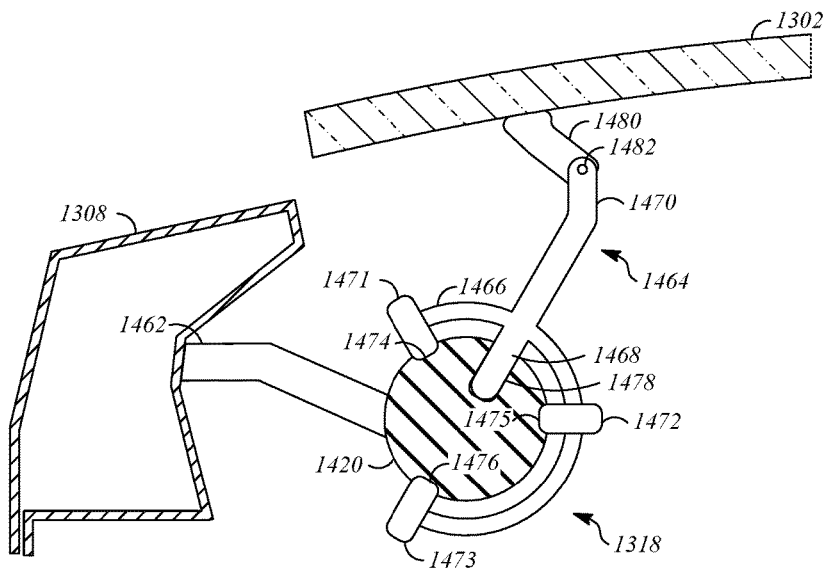
FIG. 15 is a cross-section view taken along line 15-15 of FIG. 13 showing the track assembly and the movable panel of the third vehicle in a raised position.

FIG. 14 shows the track assembly 1318 and the movable panel 1302 of the third vehicle 1300 in a lowered position, and FIG. 15 shows the track assembly 1318 and the movable panel 1302 of the third vehicle 1300 in a raised position.

The track assembly 1318 includes a track body 1420 that extends generally in the longitudinal direction of the third vehicle 1300 along an axis of the track body 1420. The track body 1420 is supported with respect to a portion of the third vehicle 1300 such as the longitudinal rails 1308 by a connecting structure 1462. The connecting structure 1462 may be a rigid body that is fixed to the longitudinal rail 1308 and to the track body 1420.

The track assembly 1318 includes a trolley 1464. The trolley 1464 is attached to the track body 1420 and is able to move longitudinally along the track body 1420. The trolley 1465 may include a wheel support portion 1466, a cam portion 1468, and a connecting portion 1470. The wheel support portion 1466 extends around the periphery of the track body 1420, which is substantially circular in the illustrated example but could have different geometries, such as square or rectangular. One or more wheels or other engaging structures are disposed on the wheel support portion 1466 for engaging the track body 1420. In the illustrated example, a first wheel 1471, a second wheel 1472, and a third wheel 1473 are connected to the wheel support portion 1466 of the trolley 1464 and are engaged with the track body 1420. In particular, the first through third wheels 1471, 1472, 1473 may be disposed in corresponding ones of a first track 1474, a second track 1475, and a third track 1476. The first through third tracks 1474, 1475, 1476 may be provided in any suitable form, such as depressions formed on the exterior surface of the track body 1420, for guiding the first through third wheels 1471, 1472, 1473. The cam portion 1468 is a structure such as a protrusion that engages a corresponding structure of the track body 1420 to guide motion of the trolley 1464 relative to the track body 1420. In the illustrated example, the cam portion 1468 is disposed within a groove 1478 that is formed in the track body 1420.

The connecting portion 1470 of the trolley 1464 is pivotally connected to a mounting structure 1480 that is connected to the movable panel 1302. For example, the mounting structure 1480 may be a rigid member that depends downward from a lower surface of the movable panel 1302.

As will be appreciated upon comparison of FIG. 14 and FIG. 15, the first through third tracks 1474, 1475, 1476 and the groove 1478 have non-linear configurations along the longitudinal length of the track body 1420. In addition, the lateral position of the track body 1420 relative to the longitudinal rail 1308 may vary by virtue of the geometry of the connecting structure 1462. In combination, the non-linear configuration of the first through third tracks 1474, 1475, 1476, the groove 1478, and the lateral position of the track body 1420 may be configured to cause the movable panel 1302 to move from a lowered position (FIG. 14) to a raised position (FIG. 15) relative to the longitudinal beam 1308 as the movable panel 1302 moves between closed and open positions as a result of longitudinal motion along the track body 1420 using the trolley 1464 of the track assembly 1318.

The geometric configuration of the first through third tracks 1474, 1475, 1476 and the groove 1478 includes a radial angle for each of the first through third tracks 1474, 1475, 1476 and the groove 1478 that changes along a length direction of the track body 1420. The radial angles for each of the first through third tracks 1474, 1475, 1476 and the groove 1478 can be measured in a plane that is perpendicular to an axis along which the track body 1420 extends. The length direction of the track body corresponds to the direction of the axis. The changing radial angles of each of the first through third tracks 1474, 1475, 1476 and the groove 1478 cause rotation of trolley 1464, including the connecting portion 1470 of the trolley 1464, as the trolley 1464 moves along the length of the track body 1420. Rotation of the trolley 1464 may be around the axis along which the track body 1420 extends. Because the connecting portion 1470 of the trolley 1464 extends outward from the axis of the track body 1420, the connecting portion 1470 functions as a lever and causes a pivotal connection 1482 of the connecting portion 1470 to the mounting structure 1480 to raise and lower relative to the longitudinal rail 1308, consequently raising and lowering the movable panel 1302.

Figure 16:
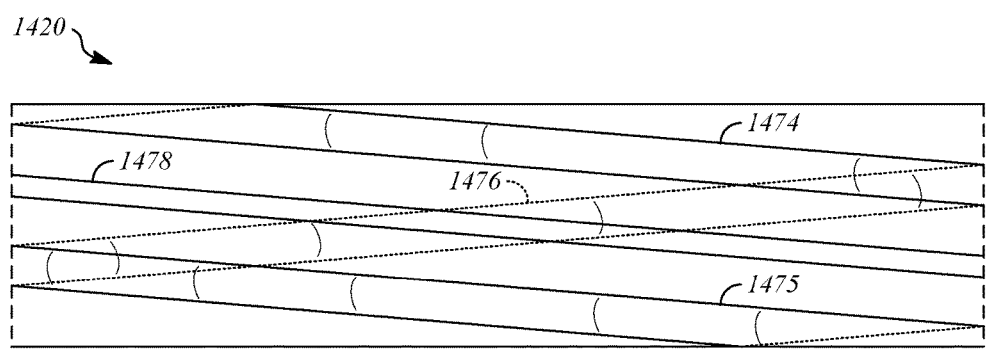
FIG. 16 is an illustration showing a portion of a track body of the track assembly of the third vehicle.

FIG. 16 is an illustration showing a portion of the track body 1420. In this example, the first track 1474, the second track 1475, the third track 1476, and the groove 1478 extend along the track body 1420 in a helical configuration in which they constantly change their radial position with respect the track body 1420. It should be understood, however, that the first through third tracks 1474, 1475, 1476 and the groove 1478 could extend along the track body 1420 according to different geometries. As an example, the first track 1474, the second track 1475, the third track 1476, and the groove 1478 could be formed on the track body with both straight and non-straight sections to achieve a desired pattern of movement for the movable panel 1302.

What is claimed is:

1. A vehicle, comprising:
   a movable panel that is movable between a closed position and an open position with respect to a vehicle body;
   a first track that is located on and fixed with respect to the vehicle body;
   a second track that is located on and fixed with respect to the vehicle body, wherein a lateral spacing between the first track and the second track varies along the first track and the second track in a front-to-rear direction; and
   an arm that is connected to the movable panel, the first track, and the second track, wherein the arm pivots with respect to the first track and the second track in correspondence with the lateral spacing between the first track and the second track during movement of the arm along the first track and the second track.

2. The vehicle of claim 1, wherein the arm is connected to the first track and the second track for sliding motion along the first track and the second track, and the arm is connected to the movable panel for pivoting motion with respect to the movable panel.

3. The vehicle of claim 1, further comprising:
   a first sliding member that is disposed in the first track, wherein the arm is connected to the first track by the first sliding member; and
   a second sliding member that is disposed in the second track, wherein the arm is connected to the second track by the second sliding member.

4. The vehicle of claim 3, wherein the first sliding member is pivotally connected to the arm, the second sliding member is pivotally connected to the arm, and the movable panel is pivotally connected to the arm.

5. A vehicle, comprising:
   a movable panel that is movable between a closed position and an open position;
   a first track;
   a second track, wherein a lateral spacing between the first track and the second track varies along the first track and the second track in a front-to-rear direction; and
   an arm that is connected to the movable panel, the first track, and the second track, wherein the arm pivots with respect to the first track and the second track in correspondence with the lateral spacing between the first track and the second track during movement of the arm along the first track and the second track, wherein a first sliding member is connected to the arm adjacent to a first end of the arm, the movable panel is connected to the arm at a second end of the arm, and a second sliding member is connected to the arm at an intermediate location along the arm between the first end of the arm and the second end of the arm.

6. The vehicle of claim 1, wherein the first track and the second track are formed on a track body.

7. The vehicle of claim 1, wherein the lateral spacing between the first track and the second track increases in the front-to-rear direction.

8. The vehicle of claim 1, wherein the vehicle body includes a rear pillar, and at least a portion of the first track extends along the rear pillar.

9. A vehicle, comprising:
   a movable panel that is movable between a closed position and an open position;
   a first track;
   a second track, wherein a lateral spacing between the first track and the second track varies along the first track and the second track in a front-to-rear direction;
   an arm that is connected to the movable panel, the first track, and the second track, wherein the arm pivots with respect to the first track and the second track in correspondence with the lateral spacing between the first track and the second track during movement of the arm along the first track and the second track; and
   a pin that connects the arm to the movable panel, wherein an end portion of the pin is disposed in a slot that has a varying elevation to move the movable panel between a lowered position and a raised position.

10. A vehicle, comprising:
    a roof panel;
    an opening that is formed in the roof panel;
    a movable panel that is movable between a closed position, in which the movable panel obstructs the opening, and an open position, in which at least part of the opening is not obstructed by the movable panel;
    a first track assembly that is positioned on a first lateral side of the opening and a second track assembly that is positioned on a second lateral side of the opening, wherein a distance between the first track assembly and the second track assembly is smaller at a first location than at a second location, each of the first track assembly and the second track assembly having a first sliding member that is slidable forward and rearward along a first path and a second sliding member that is slidable forward and rearward along a second path;
- a first arm that is pivotally connected to the movable panel, pivotally connected to the first sliding member of the first track assembly, and pivotally connected to the second sliding member of the first track assembly; and
- a second arm that is pivotally connected to the movable panel, pivotally connected to the first sliding member of the second track assembly, and pivotally connected to the second sliding member of the second track assembly,
- wherein the first path and the second path of each of the first track assembly and the second track assembly are farther apart from one another at the second location as compared to the first location to cause pivoting of the first arm and the second arm in response to movement of the movable panel between the closed position and the open position.

11. The vehicle of claim 10, wherein the first sliding member of the first track assembly is connected to the first arm adjacent to a first end of the first arm, the movable panel is connected to the first arm at a second end of the first arm, the second sliding member of the first track assembly is connected to the first arm at an intermediate location along the first arm between the first end of the first arm and the second end of the first arm, the first sliding member of second track assembly is connected to the second arm adjacent to a first end of the second arm, the movable panel is connected to the second arm at a second end of the second arm, the second sliding member of the second track assembly is connected to the second arm at an intermediate location along the second arm between the first end of the second arm and the second end of the second arm.

12. The vehicle of claim 10, wherein the first paths of the first and second track assemblies are defined by first tracks and the second paths of the first and second track assemblies are defined by second tracks.

13. The vehicle of claim 10, wherein the arm pivots with respect to the first path and the second path in correspondence with a lateral spacing between the first path and the second path during movement of the arm.

14. The vehicle of claim 10, further comprising:
- a rear pillar, wherein at least a portion of the first path extends along the rear pillar.

15. The vehicle of claim 10, further comprising:
- a pin that connects the arm to the movable panel, wherein an end portion of the pin is disposed in a slot that has a varying elevation to move the movable panel between a lowered position and a raised position.

16. The vehicle of claim 5, wherein the arm is connected to the first track and the second track for sliding motion along the first track and the second track, and the arm is connected to the movable panel for pivoting motion with respect to the movable panel.

17. The vehicle of claim 5, further comprising:
- wherein the arm is pivotally connected to the first sliding member; and
- wherein the arm is pivotally connected to the second sliding member.

18. The vehicle of claim 5, wherein the first track and the second track are formed on a track body, and the lateral spacing between the first track and the second track increases in the front-to-rear direction.

19. The vehicle of claim 9, wherein the arm is pivotally connected to a first sliding member that is disposed in the first track, the arm is pivotally connected to a second sliding member that is disposed in the second track, and the arm is pivotally connected to the movable panel.

20. The vehicle of claim 9, wherein the first track and the second track are formed on a track body, and the lateral spacing between the first track and the second track increases in the front-to-rear direction.

* * * * *